M. B. McLAUTHLIN & A. K. TYLEE.
ELECTRIC DRIVING APPARATUS.
APPLICATION FILED JULY 9, 1909.
1,169,174.
Patented Jan. 25, 1916.
4 SHEETS—SHEET 2.
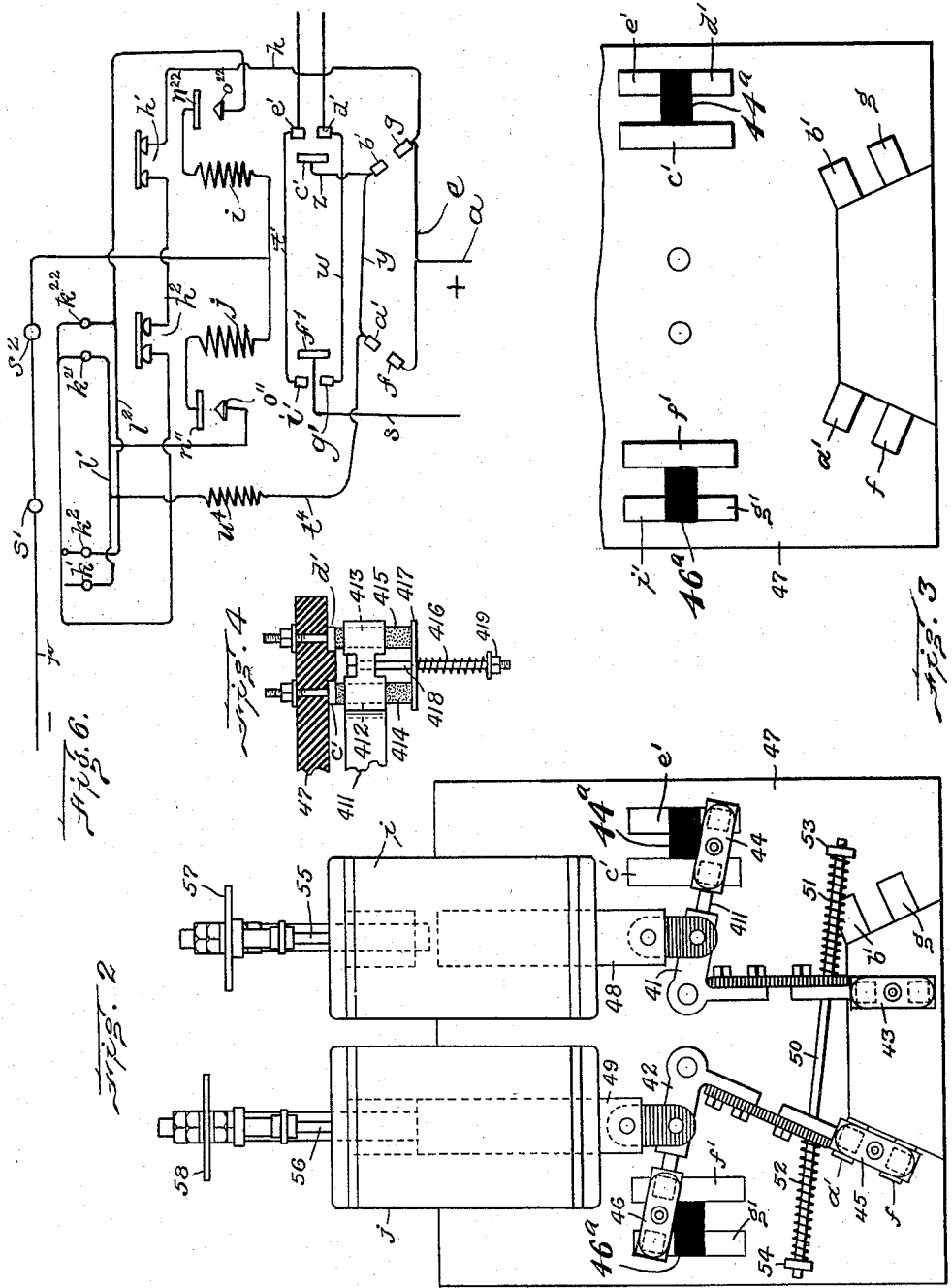

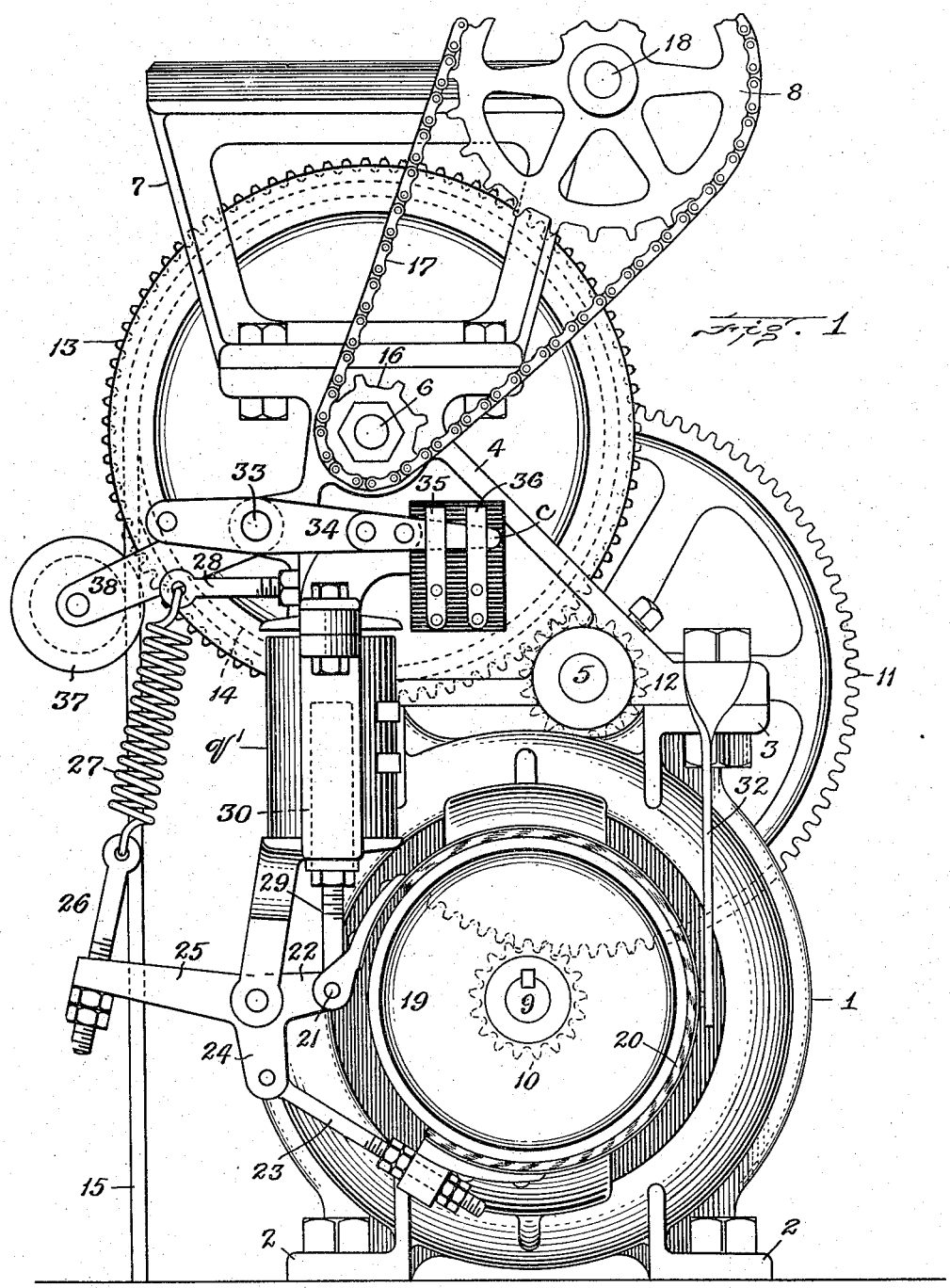

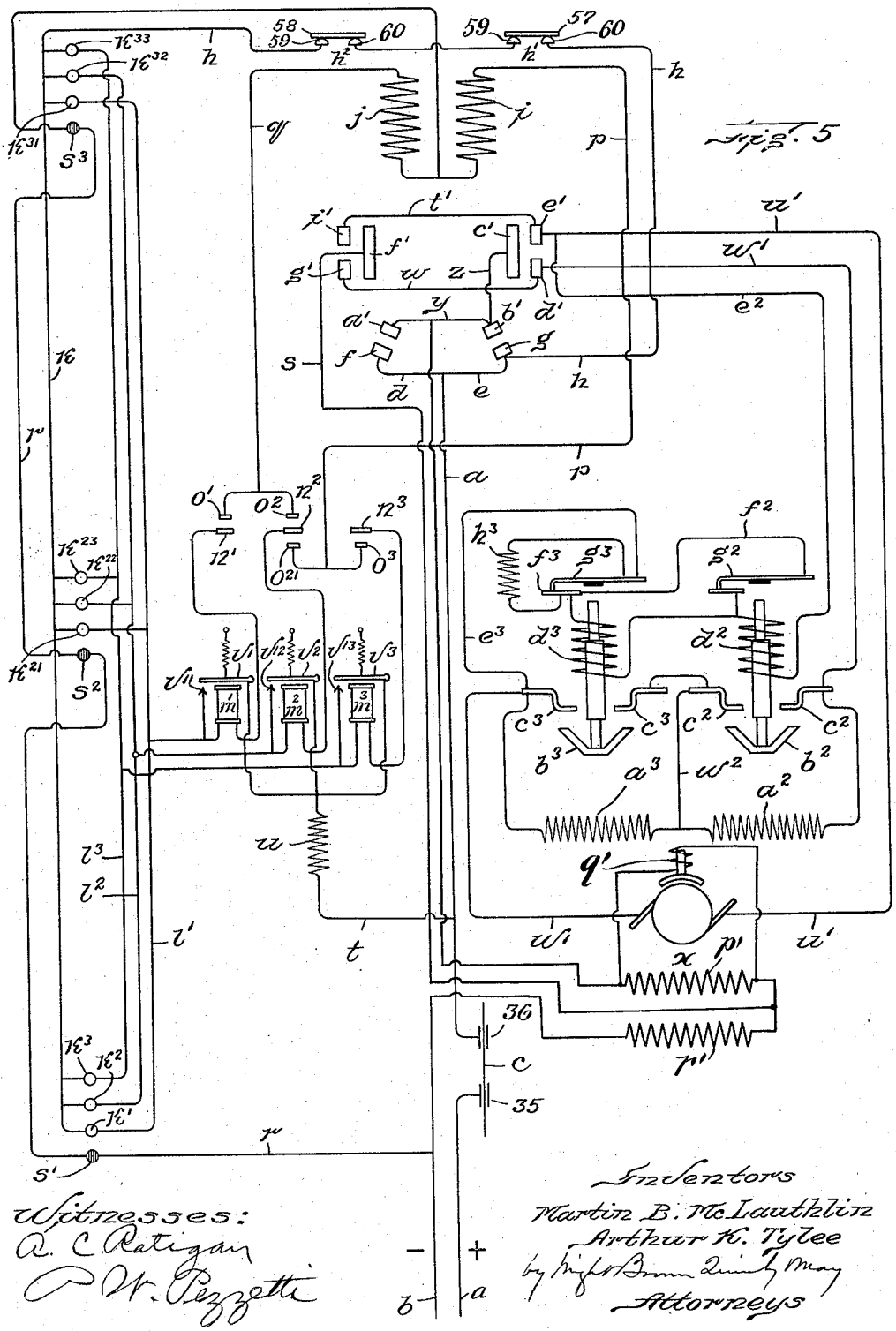

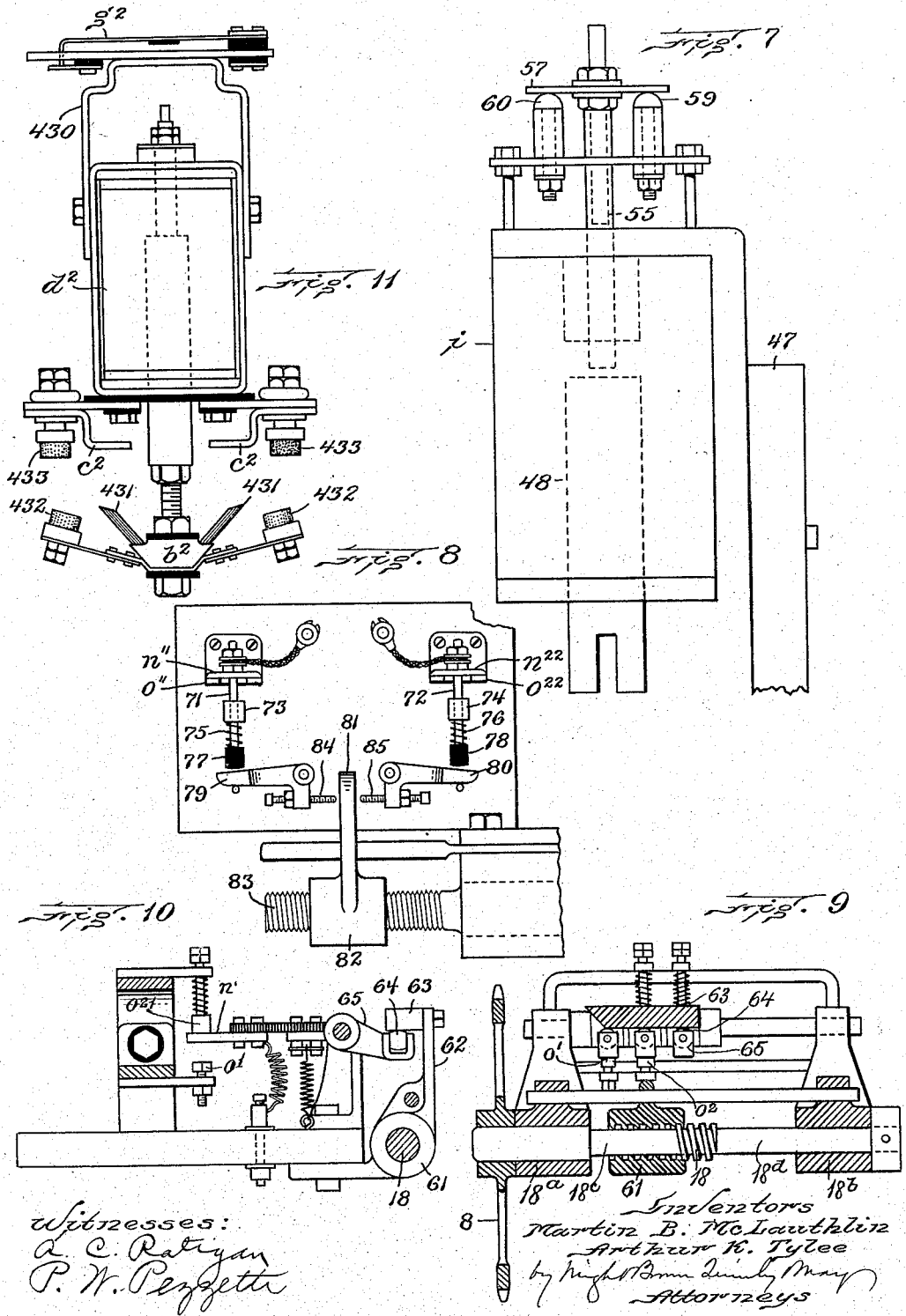

UNITED STATES PATENT OFFICE.

MARTIN B. McLAUTHLIN, OF MALDEN, AND ARTHUR K. TYLEE, OF BROOKLINE, MASSACHUSETTS.

ELECTRIC DRIVING APPARATUS.

1,169,174.  Specification of Letters Patent.  Patented Jan. 25, 1916.

Application filed July 9, 1909. Serial No. 506,760.

*To all whom it may concern:*

Be it known that we, MARTIN B. McLAUTHLIN, of Malden, in the county of Middlesex and State of Massachusetts, and ARTHUR K. TYLEE, of Brookline, in the county of Norfolk and State of Massachusetts, have invented certain new and useful Improvements in Electric Driving Apparatus, of which the following is a specification.

This invention relates to a hoisting apparatus operated by an electric motor, and to an electrical system of controlling the motor, whereby the same may be caused to raise or lower the load and to stop the same at any predetermined level.

The apparatus here illustrated as embodying the principles of the present invention was designed primarily as a means of raising and lowering a dumb-waiter, but it is equally applicable to elevators of other sorts, and to any hoisting mechanism where it is desirable to raise or lower a load to certain definite levels, and to prevent interference with the motor while the load is between such levels.

The object of the invention is to provide an improved system of electrical control for such an apparatus by which the dumb-waiter, elevator or other load may be started from any of the levels or stages between which it is carried, and be caused to stop automatically at any other designated level or stage, by which also the load may be instantly arrested at any point in case of emergency; to make impossible a reversal of the motor while it is running; to arrange in a controller of this character one circuit by which the magnets governing the motor-controlling switches may be energized to operate such switches, and a different circuit by which the magnets may be maintained in an energized condition when the first circuit is broken; to provide a novel form of selector operated by the motor to control the conditions under which the motor may be caused to drive in either direction when the load is at the various stages; and to provide means for automatically stopping the motor in case of breakage of the rope by which the load is supported.

Another object is to furnish a compactly arranged mechanism forming with the motor a single entirety which may be supported upright on a floor or framing, or be secured to an upper support so as to hang downward; to arrange the mechanism so that the hoisting rope will hang clear of the motor when the mechanism is upright, and will extend nearly in line with the center thereof when the mechanism is inverted; and in general improve the details of construction, arrangement and electrical control so as to obtain efficient and economical results with the maximum of simplicity.

The preferred embodiment of an apparatus and electrical installation adapted to secure the objects outlined above is described in detail in the following specification and illustrated in the drawings.

Figure 1 represents an elevation of the mechanical part of the equipment, showing the electric motor, gearing and hoisting rope. Fig. 2 represents an elevation of the motor-controlling switches by which the motor is caused to operate in either direction, and the magnets by which the switches are controlled. Fig. 3 represents an elevation of the switch-board and the contacts thereon with which the switches shown in Fig. 2 coöperate. Fig. 4 represents a plan view of one of the main switch elements. Fig. 5 represents a diagram of the electrical connection by which the motor is controlled, showing a selective system in which the load is adapted to be stopped at one or more intermediate points between its limits of travel. Fig. 6 represents a diagram showing a modification of the selective parts of the system adapted for an apparatus wherein the load is normally stopped only at its extreme upper and lower positions. Fig. 7 represents a side elevation of one of the magnets by which the main motor switches are controlled. Fig. 8 represents an elevation of a motor-operated selector adapted for use with the two-stage installation. Fig. 9 represents a sectional elevation of the selector by which the load is caused to stop at more than two levels. Fig. 10 represents an end elevation, partially in section, of the same. Fig. 11 represents an elevation of a form of switch adapted to cut out resistance in the motor armature circuit.

The same reference characters indicate the same parts in all the figures.

Referring first to Fig. 1, which shows the mechanical details of the hoisting apparatus, an electric motor is designated by 1. The motor casing has lugs 2 at its bottom, and 3 at its top, each set of lugs being in one plane, and the planes of the two sets being preferably parallel to each other. The case itself is symmetrical and may be placed with either side up, resting either on the lugs 2 or the lugs 3. The uppermost set of lugs supports a frame 4 having bearings for two shafts designated at 5 and 6 respectively. On the top of frame 4 is bolted a second frame 7 having a bearing for a sprocket wheel 8.

The armature shaft 9 of the motor carries a pinion 10 which meshes with a gear wheel 11 on the shaft 5. This latter shaft also carries a pinion 12 which meshes with a gear 13 on the shaft 6. The same shaft carries a hoisting drum or traction sheave 14 around which the rope 15 which supports the dumb-waiter, elevator or other load is wound. The gearing between the armature shaft and drum is such as to effect a great reduction of speed, and is so arranged that when the apparatus is set upright, as shown in Fig. 1, the rope 15 hangs clear of the motor, while if the mechanism were reversed and suspended from an overhead support, the rope would hang from the opposite side of the drum or sheave, nearly in line with the center of the motor. On the shaft 6 is secured a sprocket 16 which drives a chain 17 engaged with the sprocket 8. The latter sprocket is fixed to a shaft 18, part of which is a screw, as shown in Figs. 8 and 9, and is used to drive a selector by which the push-buttons or other primary control switches for the motor at different floors may be rendered inoperative, according to the position of the load, as will hereinafter more fully appear.

On the armature shaft is secured a drum 19 about which passes a band brake 20, one end of which is fastened by a pivot pin 21 to the arm 22 of a three-armed lever, the other end of which is fastened by means of an adjustable link 23 to a second arm 24 of this lever. A third arm 25 of the lever carries an adjustable pin 26 to which is connected one end of a spring 27, the other end of the lever being fastened to a fixed pin 28. The tendency of the spring is to swing the lever in such a direction as to bind the brake upon the drum. Thus the brake is normally set and the motor can only be started upon the application of a counter force to relax the brake. Such a force is applied by bar 29 on the core 30 of a solenoid magnet $q'$, the bar being connected to the pin 21. When the magnet is energized, the bar is raised and the lever turned in opposition to the spring 27 so as to relax the brake. The latter is supported at the side opposite to the lever by a metallic strap 32 hanging from the frame above the motor, this strap being designed to support the brake and prevent it from binding on the drum when it is loosened.

Pivoted at 33 on the frame 4 is a lever 34 carrying a switch $c$ which makes contact with terminals 35 36 in the main motor circuit, as will appear from an inspection of the diagram of electrical connections. As long as the switch is in the position shown in Fig. 1, the line is connected and current may flow to the motor. The switch is maintained in this position by the tension of the hoisting rope 15 which bears on a roll 37 carried by an arm 38 which is connected to the switch-carrying arm 34. In case the rope should break or become slack, the roll 37 is allowed to drop and to move the switch $c$ out of contact with the terminals 35 36. This breaks the circuit and the motor stops.

The starting and stopping of the motor in either direction under ordinary conditions is governed by the switches 41 42, of which the former carries bridge contacts 43 44, and the latter carries similar contacts 45 46. These switches are in the form of bell-crank levers pivotally mounted upon a board 47 and connected to the cores 48 49 respectively of solenoid magnets $i$ and $j$. The depending arms of the switch levers are connected together with provision for lost motion, by means of a rod 50 passing through the adjacent arms and having on its outer ends springs 51 and 52 contained between the respective lever arms and abutments 53 54 on the ends of the rod. When either of the cores is lifted by the attraction of its respective solenoid magnet, it shifts the corresponding switch into a position such as that occupied by the switch 42 in Fig. 2. When neither magnet is energized, both switches hang in such a location as that occupied by the switch 41. The magnets are so controlled that they are energized independently so that only one can be caused to shift the switches at any time. Whenever either switch is shifted out of the normal position, in which its lower arm is vertical, these springs are pressed so that their force may be exerted to assist in returning the switch to normal position when the respective solenoid is deënergized.

The manner in which the switches 41 and 42 control the motor will best be understood from an inspection of the diagram of electrical connections shown in Fig. 5. In this figure $a$ and $b$ represent the main leads, of which for the purpose of illustration, $a$ may be considered positive and $b$ negative. The contacts 35 and 36 previously mentioned are in the line $a$, and the slack rope switch $c$ is shown as bridging them and making the line continuous. $a$ is connected by the branches $d$ and $e$ with the contacts $f$ and $g$ respectively, and the latter contact is connected with a wire $h$ which leads to the line $k$ in which are the push-buttons or other manually-controlled switches for starting the motor. In the line $h$ are breaks $h'$ and $h^2$ which are closed when the magnets $i$ and $j$ are inoperative, but one of which is open when either magnet is energized. The means for opening these breaks is shown in Figs. 2 and 7. In the end of the magnets $i$ and $j$ are set movable bars 55 and 56 respectively, which carry disks 57 and 58. These disks, when the cores are depressed, rest on the contacts 59 60, which are connected in the line $h$ and thus bridge the gaps $h'$ and $h^2$. The rods 55 and 56 are of such length that when the corresponding core is depressed, the rods hang freely and the disks rest on the contacts. When either magnet is energized, its core in rising strikes the bar 55 or 56, and thereby lifts the corresponding disk out of contact with the corresponding pole pieces and breaks the line $h$. It may be observed that the disk 57 bridges the break at $h'$ and the disk 58 that at $h^2$.

The line $k$ which is connected with $h$, extends throughout the entire range of travel of the dumb-waiter, elevator or the like, and is connected through push-buttons or other convenient forms of switch with lines $l'$ $l^2$ and $l^3$, there being as many of such lines, and consequently as many push-buttons, as there are stops for the elevator. The several manually-operated switches or push-buttons are indicated at the lowest level by $k'$ $k^2$ and $k^3$, at the intermediate level by $k^{21}$ $k^{22}$ and $k^{23}$, and at the highest level by $k^{31}$ $k^{32}$ and $k^{33}$. If either $k'$ $k^{21}$ or $k^{31}$ is operated, the current flows from $k$ into the line $l'$, and thence through the connections presently described to the magnet $i$ or $j$ to operate the motor-controlling switches. Similarly, pressure applied to $k^2$ $k^{22}$ or $k^{32}$ sends a current through the line $l^2$, while operation of $k^3$ $k^{23}$ or $k^{33}$ connects $l^3$ with the line $k$. By manipulating these switches, the elevator may be actuated at either floor to rise or descend, and to stop at any desired floor, with the single exception that it cannot be made to descend when at the bottom, nor to rise when at the top.

The lines $l'$ $l^2$ and $l^3$ are connected through electro-magnets $m'$ $m^2$ and $m^3$ respectively, with movable switch contacts $n'$ $n^2$ and $n^3$ respectively. The switch $n'$ is adapted to make contact with a terminal $o'$, the switch $n^2$ with either a terminal $o^2$ or $o^{21}$, and the switch $n^3$ with a terminal $o^3$. These switches are governed by a selective mechanism under the control of the motor, which will be presently described. A line $p$ connects the terminals $o^{21}$ and $o^3$ with the solenoid $i$, while the other main solenoid $j$ is connected with the contacts $o'$ and $o^2$ by a wire $q$.

It may be considered for the purpose of illustration that the solenoid $i$ is energized for raising a load, and $j$ for lowering it. Consequently the selector mechanism is arranged so that when the elevator is up, the switches $n'$ and $n^2$ make contact with terminals $o'$ and $o^2$. Then currents sent through the lines $l'$ or $l^2$ will cause the elevator to descend to the bottom or the second stage, respectively. Conversely, if the elevator is down, switches $n^2$ and $n^3$ are in contact with terminals $o^{21}$ and $o^3$, and manipulation of the push-buttons to send current through the lines $l^2$ $l^3$ will energize the up magnet $i$ and cause the elevator to ascend. When the elevator is at the middle stage, $n'$ is connected with $o'$ and $n^3$ with $o^3$, the switch $n^2$ being in contact with neither $o^2$ nor $o^{21}$. In that case, if button $k'$ $k^{21}$ or $k^{31}$ is pressed, the elevator will descend, and if any of the buttons in line $l^3$ is pressed, the elevator will rise, but connection of line $l^2$ by any of its buttons will produce no effect, because the connection between this line and the solenoids is broken by the position of the switch $n^2$.

The selector switches are operated by the motor through the sprocket 8 and shaft 18, the latter being as shown in Fig. 9, a screw and carrying a nut 61 which has a bracket 62 (see Fig. 10) carying a cam 63. This cam engages rolls 64 on levers 65, which levers carry the switches $n'$ $n^2$ and $n^3$. The complemental contacts are respectively above and below these switches. As the cam 63 reciprocates, on rotation of the armature of the motor, the switches are successively raised and lowered, the timing being such that each switch is moved out of engagement with its contact when the elevator arrives at the floor represented by that switch. In the diagram three floors only are represented for the purpose simply of illustrating the principle, but it is obvious that the same principle may be extended indefinitely to adapt the apparatus for any number of floors.

The return wire from the magnets is indicated at $r$. It is connected to both solenoids and to the line wire $b$, and passes throughout the extent of travel of the elevator along with the wires $k$ and $l'$, $l^2$ and $l^3$. This line $r$ has a number of emergency switches indicated at $s'$ $s^2$ and $s^3$, there being one at each floor. These switches are normally closed so that a current ordinarily flows through them, but in case it is desired to stop the motor quickly, any one of them may be actuated to break the circuit.

It has already been stated that the magnet circuit $h$ is broken at $h'$ or $h^2$ when either of the solenoid magnets $i$ or $j$ is energized, and the circuit is also broken when any of the starting button switches is released. In order to maintain the switches in the position to which they are brought by either magnet, after this circuit is broken, a different circuit is provided which is automatically cut in as soon as the solenoid is energized. This circuit is shown at $t$ and is connected with the line wire $a$. It is divided into as many branches as the number of manually controlled circuits, which branches are connected respectively with the armatures $v'$, $v^2$ and $v^3$ of the magnets $m'$ $m^2$ and $m^3$. When these magnets are energized, their armatures are attracted and caused to make contact with complemental contacts $v^{11}$ $v^{12}$ and $v^{13}$ joined to the lines $l'$ $l^2$ $l^3$, respectively. For instance, suppose current is passed through the line $l'$ to cause the elevator to descend. The current then passes through the magnet $m'$ and draws the armature thereof into engagement with the contact $v^{11}$. This closes the auxiliary circuit so that when the primary circuit is broken, the current flows from the wire $a$ through $t$, armature $v'$, contact $v^{11}$, magnet $m'$, and thence through the switch $n'$, contact $o'$ and line $q$ to the solenoid. As long as any current flows through this circuit, the magnet $m'$ is in an energized condition and the circuit is complete. As soon as the switch $n'$ is separated from the contact $o'$, this circuit is broken, the magnet $m'$ loses its energy, and the armature $v'$ separates from contact $v^{11}$. Current is then prevented from flowing through the circuit $t$ until the auxiliary circuit has been made by another manual closing of the primary circuit. In the circuit $t$ is a resistance $u$ which allows a lesser current to flow to maintain the core of either solenoid in the position to which it is brought by the stronger current flowing through the primary circuit. Each of the primary circuits and the magnets $m^2$ $m^3$ therein act in the same manner. Thus it will be seen that whenever any button is pressed to shift the main switches and start the motor, an auxiliary circuit is automatically cut in to maintain the switches in the operative position until the elevator reaches the predetermined point. The fact that the primary circuit is broken whenever either solenoid magnet is energized prevents interference with the motor until the elevator has reached the floor to which it is directed, or has otherwise been stopped.

The motor circuits are controlled so as to drive the motor in either direction, by the switch levers 41 42 in the following manner: Complemental to the contacts $f$ and $g$ which are connected with the line wire $a$ are contacts $a'$ and $b'$ which are connected with $f$ and $g$ respectively, by the switch members 45 and 43. The relation of the switches as shown in Fig. 2 is such that only one of these connections is made at any one time. The bridging contact 44 of the switch 41 is adapted to connect a contact piece $c'$ with either $d'$ or $e'$, according to the position of the switch. Similarly, the bridge contact 46 of the other switch is adapted to connect $f'$ with either $i'$ or $g'$. It should be noted that the contacts $c'$, $d'$ $e'$, likewise the contacts $f'$, $g'$, $i'$ are electrically insulated and distinct from one another, not being connected electrically except when the switch contact 44 connects $c'$ with $d'$ or $e'$, or the switch 46 connects $f'$ with $g'$ or $i'$. A filling piece $44^a$ is set between the contacts $c'$, $d'$ and $e'$, and a similar piece $46^a$ between $f'$, $g'$ and $i'$, for the purpose of mechanically bridging or filling the spaces between the contacts and thus preventing the spring brushes of which the switches are in part composed (as hereinafter more fully described) from being projected between the contacts. These filling pieces are either made themselves of insulating material, or are insulated from the contacts, and their function is purely mechanical, not electrical. $a'$ and $b'$ are connected by a connection $y$ and the latter contact is connected with $c'$ by a connection $z$, while a connection $w$ joins $d'$ and $g'$. $a'$ is connected through the conductor $j'$ with a shunt field coil $p'$ of the motor and brake coil $q'$, these coils being connected with the line $b$. A conductor $s$ leads directly from the line $b$ to the contact $f'$. When the magnet $i$ is energized so as to place the switches in position for starting the motor to raise the load, the switch member 43 joins $b'$ and $g$ together, the member 44 joins $c'$ and $e'$ together, and the member 46 joins $f'$ and $g'$. The course of the current is then through $a$ $e$ $g$ $b'$ $z$ $c'$ $e'$ and the armature circuit $u'$ to the armature, which is shown at $x$. Returning, the circuit is through the armature lead $w'$ which is connected to the contact $d'$, thence through the conductor $w$ to the contact $g'$, across the switch member 45 to contact $f'$, and thence through the conductor $s$ to the line wire $b$. The shunt circuit passes from $b'$ through $y$ and $j'$ to the shunt coil $p'$ and brake coil $q'$. This coil acts as previously described, to release the brake 20, and thus as long as the motor is in operation, the brake is released. As soon as the motor stops, the switches are released and allowed to open the gaps between the contacts $b'$ and $g$ so that the brake coil loses its energy and the brake is again caused to grip the drum 19 by the spring 27. $r'$ represents the series coil of a series or compound-wound motor and is in the main lead $b$ of the circuit.

When the magnet $j$ is energized to drive the motor in the direction necessary for lowering the load, contacts $a'$ $f$, $f'$ $i'$ and $c'$ $d'$ are connected by the switch members 45 46 and 44 respectively. The course of the current is then through $a$ $d$ $f$ $a'$ $y$ $z$ $c'$ $d'$ and $w'$ to the armature through resistances hereinafter described, returning through the line $u'$ to $e'$ and thence through the intermediate conductor $t'$ to the contact $i'$. Thus the direction of current in the armature circuit is the reverse of that previously described. From $i'$ the current returns through the switch 46 to $f'$ and conductor $s$ to the line $b$. The shunt circuit through the field and brake coils is the same as before, from the contact $a'$ to the conductor $j'$. Starting resistances $a^2$ and $a^3$ are interposed in the armature circuit, and these resistances are automatically cut out one at a time after the armature starts to rotate, by bridge switches $b^2$ and $b^3$ which coöperate with terminal contacts $c^2$ $c^3$, the first bridging the resistance $a^2$ by a conductor $w^2$, and the latter bridging the resistance $a^3$. The switches $b^2$ $b^3$ are carried by the cores of solenoid magnets $d^2$ $d^3$ which receive current through a shunt $e^2$ connected with the armature line $u'$ and with the wire $e^3$ which is joined to the armature lead $w'$. The two solenoid magnets are in series and part of the current which passes through $d^2$ is conducted through a shunt $f^2$ by means of a normally closed switch $g^2$. The entire current in the shunt $e^2$ is carried through the magnet $d^2$ so that the core thereof lifts and cuts out the resistance $a^2$ before the other resistance is cut out. As soon as the core of switch $b^2$ rises, it disconnects switch $g^2$, cutting out the shunt $f^2$. Thereupon the entire current passes through the magnet $d^3$ and switch $b^3$ is raised, cutting out the second resistance $a^3$. The terminal of the second solenoid joins a contact $f^3$ with which a switch $g^3$ coöperates, said switch being connected both with the terminal $e^3$ and with a resistance coil $h^3$. While the switch $g^3$ engages the contact $f^3$, the current passes directly into the terminal $e^3$, but as soon as the switch $b^3$ is raised, the core strikes switch $g^3$ and breaks the direct circuit, causing the current to flow through the resistance $h^3$ before passing to the terminal $e^3$. The resistance cuts down the amount of current flowing through the shunt circuit, allowing only just enough to pass to maintain the switches in the raised position.

As a precautionary measure, to prevent breakage of the selective switch-operating mechanism, in case careless work in connecting the wires of the motor-controlling circuits should result in the making of wrong connections, so that the switch-controlling circuits are not broken at the proper times, we construct the screw 18 which drives the switch-operating traveler 61 in such a manner as to allow the traveler to stop before coming into contact with the bearings $18^a$ and $18^b$ at either end of the screw. As appears in Fig. 9, the screw shaft is threaded only in its central portion, and has blank spaces unprovided with threads at its ends, represented by $18^c$ and $18^d$. These blank spaces are of slightly greater length than the traveler 16, so that the latter will run off the thread before coming into contact with either bearing. It might happen, on account of incorrect connections of the wires, that the magnet circuit would not be broken when either of the endmost selective switches is separated from its contact, so that the motor and screw shaft would not cease to run when the traveler reaches the normal limit of its travel. If the threads of the screw were extended far enough to bring the traveler into contact with the bearings, such continuous motion would result in the breakage of some of the parts, but it is prevented from doing harm by the limiting of the extent of the screw threads, as here shown. The combined length of the threaded part of the shaft and the traveler is enough to give the normal travel to the latter, but not to bring it into contact with the bearings.

In Fig. 6 is shown a simpler form of selective control for a two-stage system, where a dumb-waiter or elevator is designed to travel between only two levels. The elements and connections which correspond to those shown in Fig. 5 are similarly lettered in Fig. 6. $k'$ and $k^2$ represent the starting switches in the primary circuits located on the lower floor, and $k^{21}$ and $k^{22}$ represent those on the upper floor for lowering and raising the elevator, respectively. The conductor $l'$ is connected through the contact $o^{11}$ and selective switch $n^{11}$ with the lowering magnet $j$, while the line $l^2$ is connected through contact $o^{22}$ and switch $n^{22}$ with the raising magnet $i$. The mechanical construction of these contacts and switches is shown in Fig. 8. The switches $n^{11}$ and $n^{22}$ are mounted on rods 71 and 72, respectively, guided in brackets 73 74 and held against the contacts by springs 75 76. On the end of the rods are insulated blocks 77 78 with which coöperate bell-crank levers 79 and 80. These levers are operated by an arm 81 on the nut 82 which is engaged with a screw 83 which corresponds with the screw 18, previously described as being driven positively by the motor. The bell-crank levers carry adjustable stops 84 85 which are directly engaged by the arm 81. When the elevator is in its uppermost position, the arm 81 displaces the bell-crank 80 and disconnects the switch $n^{22}$ from the contact $o^{22}$, this being the condition illustrated in the diagram of Fig. 6. The motor can then be operated only in the direction to lower the elevator, by manipulation of the switches $k'$ or $k^{21}$. Conversely, when the elevator is down, the switch $n^{11}$ is separated from contacts $o^{11}$ by displacement of the bell-crank 79.

Upon operation of either of the main solenoid magnets $i$ or $j$, the circuit is broken at $h'$ or $h^2$, respectively, in the manner already described. A secondary circuit permitting the flow of sufficient current to maintain the magnet core and switch in their elevated position is, however, provided by the conductor $t^4$, in which is a resistance $u^4$, connected with the switch contacts $a'$ $b'$ at one end, and with the wires $l'$ and $l^2$ at the other end. When either switch is operated, by raising of the solenoid core thereto connected, electrical connection is made between the lead wire $a$ and the branch circuit $t^4$. Current is thus allowed to flow through the resistance $u^4$ and the magnet coils, the resistance being so great that the current passing is only strong enough to retain the elevated core in that position, but not enough to elevate the other core. When the motor-operated traveler 82 is in any position except either of its extremes, both of the selective switch contacts are connected, so current flows from the main line through the resistance $u^4$ and through both the lines $l'$ and $l^2$ to both main magnets, but owing to the fact that one core is raised and the other down, and that the amount of current which the resistance allows to flow through the coils is not great enough to elevate the lowered core, no change in the relative arrangement of the cores and switches occurs.

It will be understood that in either embodiment of the invention the magnets for operating the switches are first energized by a manually-controlled primary circuit, and that immediately thereupon the secondary circuit is made to maintain sufficient energy in the magnets to prevent displacement of the switches. In the one case, the secondary circuit is made by the action of the current in the primary circuit, and in the second case it is made by the main switch. In either case the secondary circuit is cut in before, or simultaneously with, the breaking of the first circuit by the solenoid cores.

One of the important features of the invention is the construction of the parts by which the primary circuit is effectually broken without the formation of an arc. As has already been stated, the conductors 57 and 58 which bridge the breaks $h'$ and $h^2$ of the primary circuit are carried by rods 55 56 operated by the cores of the magnets. These cores strike the rods with a sudden blow and give the rods and bridges so much momentum that they are carried through a greater distance than the travel of the cores. Thus they are suddenly separated from the contacts 59 60 through a distance sufficient to break any arc that may be formed, before they are restored by gravity to the normal position, resting on the ends of the cores. When either of the disk conductors is supported by the respective magnet core, it is separated from the terminals 59 60 by a gap sufficient to prevent any jumping of the current, but before coming to rest in this location, it has been moved through a greater distance to break the arc which is formed when the separation is first made.

A detail of one of the main switch members is shown in Fig. 4, which may represent any of the members 43 44 45 and 46. The arm 411 which carries the switch is of conducting material and has sockets 412 and 413 through which the brushes 414 and 415 extend. These brushes are independent of one another and are pressed toward the pole pieces with which they make contact, by a spring 416 acting through a plate 417 on both of them. The spring surrounds a rod 418 which has a head engaged with the arm 411, and also carries an abutment 419 between which and the plate 417 the spring is compressed.

A detail of one of the magnet switches by which the armature resistance is cut out is shown in Fig. 11. The coil $d^2$ thereof carries a frame 430 on which the switch $g^2$ and its complemental contact piece are mounted. The switch $b^2$ itself consists of the metallic brushes 431 which make contact with the metal terminal pieces $c^2$, and the carbon contacts 432 making contact with carbon terminals 433. The contacts 432 are mounted on spring arms so as to remain in contact with the poles 433 after the part 431 has separated from the terminals $c^2$, this being for the purpose of preventing sparking between the metal contact pieces.

The foregoing description refers to the apparatus and the electrical motor-controlling system as applied for hoisting and lowering loads, but we desire it to be clearly understood that we do not limit the invention thus strictly, but consider the motor-controlling system to be applicable to motors used for all purposes where a load is to be moved in opposite directions and automatically stopped at certain predetermined points. Furthermore, we desire it to be understood that the controlling system is applicable to alternating currents of one, two or three phases, but for convenience a system designed for direct currents has been described.

We claim:—

1. An electric motor control comprising, in combination with a motor, switches for causing said motor to drive in opposite directions, magnets for shifting said switches, a main circuit including said magnets and having normally open manually controlled switches, means for breaking said circuit when either magnet is energized, and a normally open shunt circuit of greater resistance than the main circuit arranged to furnish current to said magnet when the main circuit is broken.

2. An electric motor control comprising, in combination with a motor, switches for causing said motor to drive in opposite directions, solenoid magnets for shifting said switches, each having a core, a main circuit including said magnets and having normally open manually controlled switches, a switch in said circuit adjacent to each of said magnets, means for causing the core of each magnet to strike the adjacent switch a sharp blow when energized, to open the switch and break the arc, and a normally open shunt circuit of greater resistance than the main circuit arranged to furnish current to said magnet when the main circuit is broken.

3. An electric motor control comprising, in combination with a motor, switches for causing said motor to drive in opposite directions, solenoid magnets for shifting said switches, a main circuit including said magnets and having normally open manually controlled switches, means for breaking said circuit when either magnet is energized, and an auxiliary circuit for supplying current to said magnet when the main circuit is broken.

4. An electric motor control system comprising in combination with a motor armature circuit of a plurality of switches for controlling the direction of current passing through said circuit, two solenoid magnets for shifting said switches, a primary circuit for said solenoids, manually operated switches in said primary circuit, a circuit breaking device for each solenoid in said primary circuit, a striker arranged for operation by the core of each solenoid for operating said circuit breaker, a shunt circuit for said solenoids, and means rendered operative by the manual completion of the primary circuit for completing said shunt circuit, and thereby causing the active one of said solenoids to remain in an energetic condition after operation of its corresponding circuit breaker to interrupt the primary circuit.

In testimony whereof we have affixed our signatures in presence of two witnesses.

MARTIN B. McLAUTHLIN,
ARTHUR K. TYLEE.

Witnesses:
ARTHUR H. BURNS,
P. W. PEZZETTI.

Copies of this patent may be obtained for five cents each, by addressing the "Commissioner of Patents, Washington, D. C."